US011977984B2

(12) United States Patent
Wiestler et al.

(10) Patent No.: US 11,977,984 B2
(45) Date of Patent: May 7, 2024

(54) USING A FIRST STAIN TO TRAIN A MODEL TO PREDICT THE REGION STAINED BY A SECOND STAIN

(71) Applicant: AstraZeneca Computational Pathology GmbH, Munich (DE)

(72) Inventors: Tobias Wiestler, Munich (DE); Simon Lanzmich, Munich (DE); Nicolas Brieu, Munich (DE); Guenter Schmidt, Munich (DE); Moritz Widmaier, Munich (DE)

(73) Assignee: AstraZeneca Computational Pathology GmbH, Munich (DE)

( * ) Notice: Subject to any disclaimer, the term of this patent is extended or adjusted under 35 U.S.C. 154(b) by 0 days.

(21) Appl. No.: 18/105,249

(22) Filed: Feb. 3, 2023

(65) Prior Publication Data

US 2023/0177341 A1 Jun. 8, 2023

Related U.S. Application Data

(63) Continuation of application No. 16/221,403, filed on Dec. 14, 2018, now Pat. No. 11,593,656.

(Continued)

(51) Int. Cl.
*G06K 9/00* (2022.01)
*G01N 1/30* (2006.01)
(Continued)

(52) U.S. Cl.
CPC .............. *G06N 3/084* (2013.01); *G01N 1/30* (2013.01); *G06N 5/04* (2013.01); *G06N 20/10* (2019.01);
(Continued)

(58) Field of Classification Search
None
See application file for complete search history.

(56) References Cited

U.S. PATENT DOCUMENTS

| 2013/0080134 A1 | 3/2013 | Donovan et al. ....... G16Z 99/00 703/11 |
| 2014/0169654 A1 | 6/2014 | Athelogou et al. .... G06K 9/127 382/133 |

(Continued)

OTHER PUBLICATIONS

Riku Turkki et al., "Antibody-supervised deep learning for quantification of tumor-infiltrating immune cells in hematoxylin and eosin stained breast cancer samples," Journal of Pathology Informatics, Sep. 1, 2016 XP055587403 (14 pages).

(Continued)

*Primary Examiner* — Wei Wen Yang
(74) *Attorney, Agent, or Firm* — Imperium Patent Works; Darien K. Wallace

(57) ABSTRACT

A convolutional neural network predicts which regions of a tissue slice would be stained by a first stain by training a model to identify those regions based only on tissue stained by a second stain. Thereafter the first stain need not be used to mark cancerous regions on other tissue slices that are stained with the second stain. The training slice is stained with a first immunohistochemical stain and a second counterstain. A target region of an image of the training slice is identified using image analysis based on the first stain. A set of parameters for associated mathematical operations are optimized to train the model to classify pixels of the image as belonging to the target region based on the second stain but not on the first stain. The trained parameters are stored in a database and applied to other images of tissue not stained with the first stain.

22 Claims, 10 Drawing Sheets

Related U.S. Application Data

(60) Provisional application No. 62/612,590, filed on Dec. 31, 2017.

(51) Int. Cl.
| | | |
|---|---|---|
| *G06N 3/084* | (2023.01) | |
| *G06N 5/04* | (2023.01) | |
| *G06N 20/10* | (2019.01) | |
| *G06T 5/20* | (2006.01) | |
| *G06T 7/00* | (2017.01) | |
| *G06V 20/69* | (2022.01) | |

(52) U.S. Cl.
CPC ............. *G06T 5/20* (2013.01); *G06T 7/0012* (2013.01); *G06V 20/69* (2022.01); *G06T 2207/20081* (2013.01); *G06T 2207/30024* (2013.01)

(56) References Cited

U.S. PATENT DOCUMENTS

| | | | |
|---|---|---|---|
| 2017/0169567 A1 | 6/2017 | Chefd'hotel et al. | ..... G06T 7/12 |
| 2017/0270666 A1 | 9/2017 | Barnes et al. | ............ G06T 7/12 |
| 2018/0165809 A1* | 6/2018 | Stanitsas | ................... G06T 5/40 |
| 2018/0232883 A1 | 8/2018 | Sethi et al. | .......... G06K 9/6267 |

OTHER PUBLICATIONS

Extended European Search Report dated May 17, 2019 in the counterpart foreign application EP18248217.4 issued by the European Patent Office (11 pages).

\* cited by examiner

USING A FIRST STAIN TO TRAIN A MODEL TO PREDICT THE REGION STAINED BY A SECOND STAIN

CROSS REFERENCE TO RELATED APPLICATIONS

This application is a continuation of, and claims priority under 35 U.S.C. § 120 from, nonprovisional U.S. patent application Ser. No. 16/221,403 entitled "Using a First Stain to Train a Model to Predict the Region Stained by a Second Stain," now U.S. Pat. No. 11,593,656, filed on Dec. 14, 2018. Application Ser. No. 16/221,403, in turn, claims the benefit under 35 U.S.C. § 119 of provisional application Ser. No. 62/612,590, entitled "Using a First Stain to Train a Model to Predict the Region Stained by a Second Stain", filed on Dec. 31, 2017. This application incorporates by reference the entire contents of U.S. patent application Ser. Nos. 16/221,403 and 62/612,590.

TECHNICAL FIELD

The present invention relates to a method for predicting which regions of tissue would be stained with one stain by training a model to identify those regions based on tissue stained with another stain.

BACKGROUND

Identifying tumor regions in digital images of cancer tissue is often a prerequisite to performing diagnostic and treatment measures, such as classifying cancers using standard grading schemes. The digital images of tissue slices used in histopathology are very large. Individual images require gigabytes to store. Manual annotation of the tumor regions in whole slides through the visual assessment of a pathologist is laborious considering the high volume of data. Therefore, "chemical annotation" has been used to substitute the marking of tumor regions by a pathologist with image recognition of regions stained by biomarkers that identify tissue that tends to be cancerous. Annotating tumor regions using specific antibody staining decreases the subjectivity of the pathologist's evaluation and accelerates the otherwise tedious process. Immunohistochemical (IHC) staining can be used to distinguish marker-positive cells that express a particular protein from marker-negative cells that do not express the protein. IHC staining typically involves multiple dyes, which includes one or more dyes connected to protein-specific antibodies and another dye that is a counterstain. A common counterstain is hematoxylin, which labels DNA and thus stains nuclei.

A protein specific stain or biomarker can be used to identify the regions of the tissue that are likely cancerous. For example, a biomarker that stains epithelial cells can identify the suspected tumor regions. Then other protein specific biomarkers are used to characterize the cancerous tissue. However, the biomarker that identifies the tumor regions can be incompatible with other protein specific biomarkers so that the biomarker that identifies the cancerous region of interest cannot be included on all slides of a tissue sample. In some situations, the region-identifying biomarker cannot be stained on top of certain other stains. The incompatible biomarkers must be stained on different tissue from adjacent slices, and then the resulting digital images of the adjacent slices are coregistered.

Thus, obtaining all of the information available from the incompatible biomarkers by using multiple adjacent slices requires different tissue of the multiple slices to be stained. As more slices are used, the differences in the tissue of farther apart slices increases. In addition, in some situations there is insufficient tissue to produce a large number of adjacent slices that would accommodate fewer biomarkers per slice. Thus, a method is sought for determining cancerous regions of interest in an image of a tissue slice that would be marked by a region-identifying biomarker without requiring the tissue slice to be stained by that biomarker.

SUMMARY

The disclosed method uses a convolutional neural network model to predict which regions of a tissue slice would have been stained by a first stain by training the model to identify those regions based only on tissue stained by a second stain. The method obviates the need to use the first stain to mark likely cancerous regions on other slices of the tissue that are stained with the second stain. Typically, a training slice of tissue from a cancer patient is stained with both a first immunohistochemical stain and a second counterstain. A first digital image of the training slice is then acquired. A target region of a first digital image is identified using image analysis based on the first stain. Then a set of parameters for associated mathematical operations of the model are optimized to train the model to classify individual pixels of the first digital image as belonging to the target region based on the second stain but not on the first stain. One of the mathematical operations is convolution filtering that applies a kernel to neighboring pixels. The optimized parameters and associated mathematical operations of the trained model are then stored in a database. A second digital image is acquired from cancerous tissue that is stained with the second stain but not with the first stain. The parameters of the trained model are then applied to the second digital image to indicate the probability that each pixel of the second digital image falls within a likely cancerous region that would have been stained with the first stain. A prediction image is generated in which particular pixel locations of the second digital image have an intensity associated with belonging to the target region.

Another embodiment of the method includes a training mode and a prediction mode. In the training mode, a first slice of tissue from a cancer patient is stained with a first stain that has a first color. For example, the first stain is pan cytokeratin (panCK), and the first color is yellowish brown. PanCK stains epithelial cells and tends to mark regions of the tissue that are likely cancerous. The first slice of tissue is also stained with a second stain that has a second color. For example, the second stain is hematoxylin, and the second color is blue. A first digital image is acquired of the first slice of tissue. Image analysis is used to determine whether each pixel of the first digital image falls within a region of interest based on the first color. A set of parameters of a model are generated that indicate the probability that each pixel of the first digital image falls within the region of interest using the second color but not the first color. The model is a convolutional neural network model, and the set of parameters is generated by training the convolutional neural network model on the first digital image in which the region of interest has been identified.

A second digital image is analyzed in the prediction mode. The second digital image is acquired from a second slice of tissue that is stained with the second stain but not with the first stain. For example, the second slice of tissue can be a slice of the tissue sample taken from the cancer patient that is adjacent to the first slice of tissue. The second slice might not be stained with the first stain because the second slice is stained with a different immunohistochemical stain that is incompatible with the first stain. The optimized set of parameters of the trained model is used to indicate the probability that each pixel of a second digital image falls within the region of interest using only the second color. Thus, the method can be used to determine the regions of the second slice that are likely cancerous without staining the second slice with the first stain. A prediction image is generated in which each pixel location of the second digital image has an intensity indicative of the probability that the associated pixel of the second digital image falls within the region of interest.

The method can be used to predict the regions that would be stained by biomarkers other than panCK by using fluorescent 4, 6-diamidino-2-phenylindole (DAPI) instead of hematoxylin. The other biomarkers whose staining regions can be predicted using counterstains such as DAPI or hematoxylin include cytokeratin 18, α-methylacyl coenzyme A racemase (AMACR), cluster of differentiation 3 (CD3) antibody stain, cluster of differentiation 4 (CD4) antibody stain and cluster of differentiation 68 (CD68) antibody stain.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
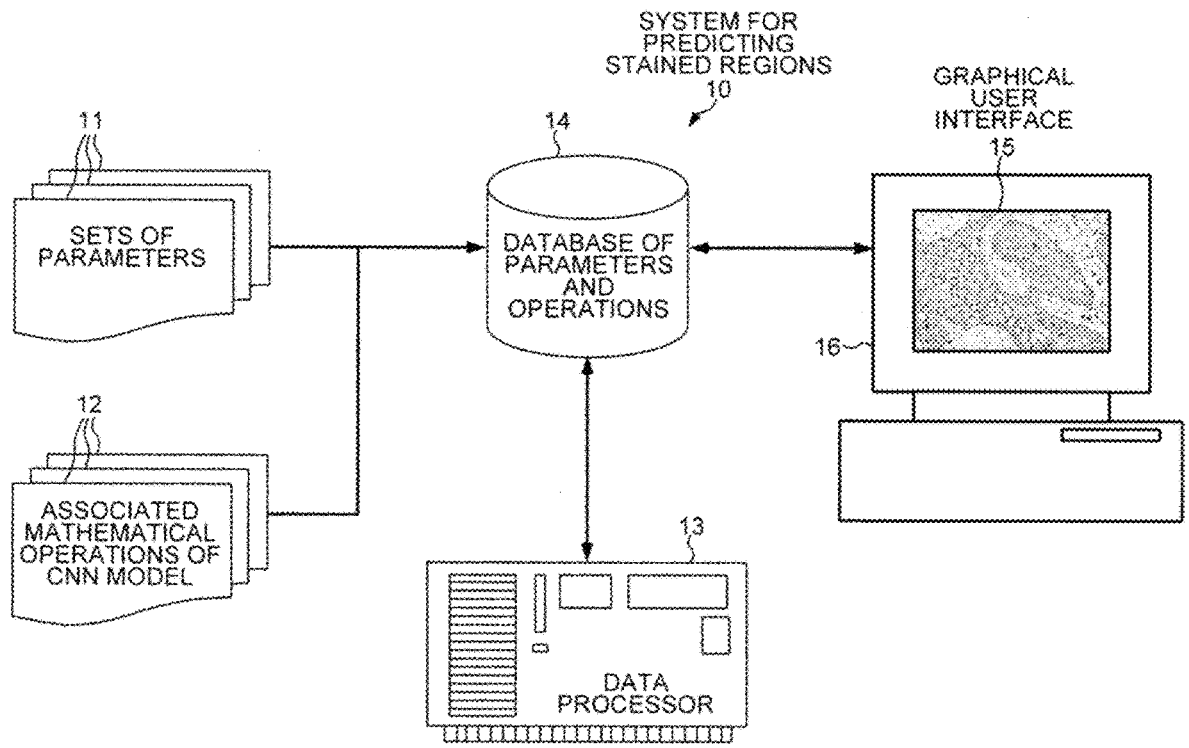
FIG. 1 is a diagram of a novel system for predicting which regions of a tissue slice would have been stained by a first stain by training a model to identify those regions based only on tissue stained by a second stain.

FIG. 1 shows a system 10 for predicting which regions of tissue would be stained by a first region-identifying biomarker by training a convolutional neural network model to identify those regions based solely on tissue stained with a second and different biomarker or stain. In one embodiment, the first region-identifying biomarker is an immunohistochemical (IHC) stain that distinguishes marker-positive cells expressing a particular protein from marker-negative cells that do not express the protein. The IHC stain is a dye that is connected to a protein-specific antibody. The second stain is the counterstain of the IHC biomarker, which is not protein specific. Examples of the first biomarker or stain include pan cytokeratin, cytokeratin 18, α-methylacyl coenzyme A racemase (AMACR), cluster of differentiation 3 (CD3) antibody stain, cluster of differentiation 4 (CD4) antibody stain and cluster of differentiation 68 (CD68) antibody stain. Examples of the second biomarker or counterstain include hematoxylin and fluorescent 4, 6-diamidino-2-phenylindole (DAPI). Hematoxylin labels DNA and thus stains nuclei. Hematoxylin has the ability to stain tissue without the addition of a dye.

Thus, in one example of the first embodiment, system 10 is trained to predict which regions of tissue of a cancer patient would be stained by pan cytokeratin (panCK) by training a convolutional neural network model to identify those regions based solely on tissue stained with the counterstain hematoxylin. PanCK is a group of protein-specific monoclonal antibodies (a biomarker) that in humans are encoded by a family of genes including about twenty epithelial genes. PanCK is used together with an attached dye to form a stain.

System 10 operates in a training mode and in a prediction mode. In the training mode, the convolutional neural network model is optimized by determining the sets of parameters 11 for associated mathematical operations 12 that best predict based only on the staining of nuclei by hematoxylin those regions on training slices that are actually stained with panCK. The training calculations are performed by data processor 13. In one embodiment, data processor 13 is a specialized processor that can simultaneously perform multiple convolution operations between a plurality of pixel matrices and corresponding kernels. The logical operations of the model are implemented on data processor 13 as hardware, firmware, software, and/or a combination thereof to provide a means for characterizing regions of tissue in the digital images. Each trained model comprising the optimized sets of parameters 11 and associated mathematical operations 12 is then stored in the database 14.

Once trained, system 10 obviates the need in the prediction mode to use panCK to stain epithelial cells to determine a likely cancerous region of tissue samples of the cancer patient. The likely cancerous epithelial regions can be predicted on slices that are not stained with panCK by applying a trained model to analyze how the counterstain hematoxylin has stained the nuclei of the tissue. For example, the likely cancerous regions that would be stained by panCK can be identified in a non-training image of a tissue slice that has been stained with only the counterstain hematoxylin and a biomarker that is incompatible with panCK. In the prediction mode, data processor 13 executes software to analyze digital images of stained tissue by applying the trained parameters 11 and associated mathematical operations 12 to predict whether pixels in the images that were not stained by an antibody stain would have been stained by that antibody stain based only on the staining of DNA in nuclei. In one embodiment, a prediction image is generated in which particular pixel locations of the non-training image have an intensity associated with belonging to the likely cancerous region that would have been stained by panCK. The prediction image is displayed on the graphical user interface 15 of a user work station 16.

Figure 2:
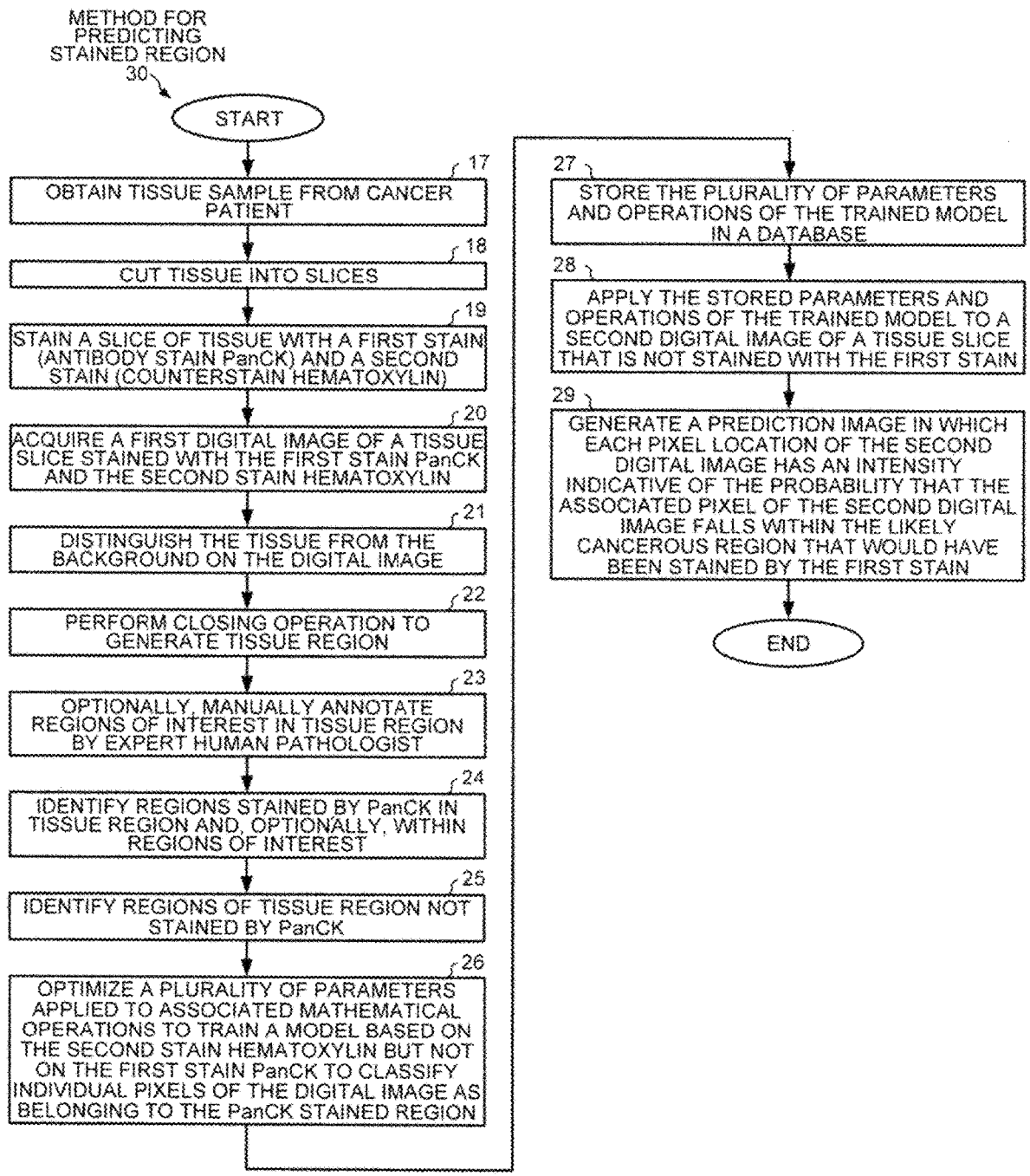
FIG. 2 is a flowchart of steps for predicting which regions of tissue would be stained by a first stain by training a convolutional neural network model to identify those regions based solely on tissue stained with a second stain.

FIG. 2 is a flowchart of steps 17-29 of a method 30 for predicting which regions of tissue would be stained by a first biomarker or stain by training a convolutional neural network model to identify those regions based solely on tissue stained with a second stain. In a first step 17, a tissue sample 31 that is to be stained with the first protein and receptor biomarker is taken from a cancer patient 32 in the form of a biopsy. For example, the tissue sample 31 includes epithelial cells of glandular tissue, such as human prostate, breast, colon or lung tissue in which tumor regions are to be identified. In step 18, the tissue sample 31 is then sliced into multiple parallel, adjacent slices. For example, the slices are consecutive sections of a formalin-fixed paraffin-embedded sample obtained from a tumor of the cancer patient 32. In order to perform the novel method for predicting tumor regions described herein, one of the slices is immunohistochemically stained with a first stain and a second stain. In step 19, one of the slices is stained with a first stain (the antibody stain panCK) as well as a second stain (the counterstain hematoxylin).

Figure 3:
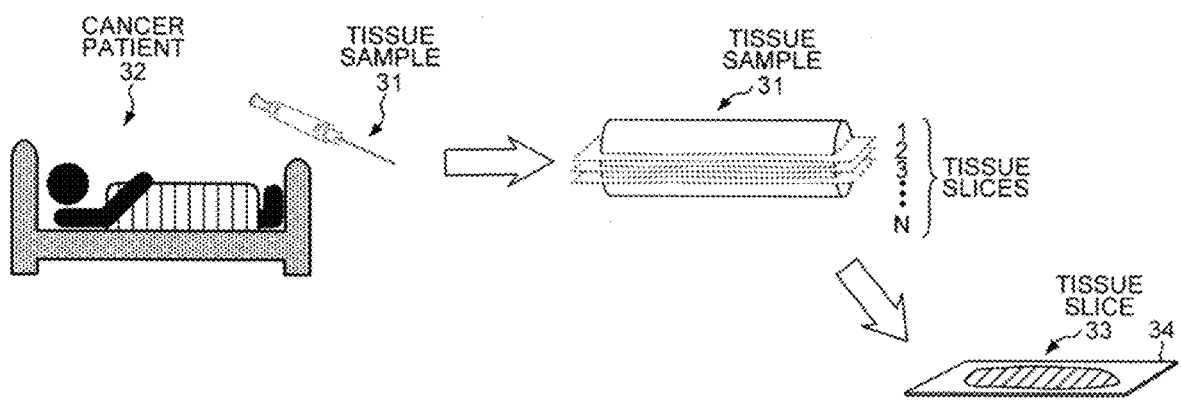
FIG. 3 illustrates the process for acquiring a digital image of a slice of tissue from a cancer patient that is stained with both a first antibody stain and a second counterstain.

FIG. 3 illustrates the tissue sample 31 being taken from cancer patient 32 and being cut into multiple parallel, adjacent slices. The tissue slice 33 that has been stained is placed on a slide 34. In step 20, a high-resolution digital image 35 is acquired from slice 33 of the tissue from cancer patient 32 that has been stained with the first and second stains. A high-resolution digital image of a tissue slice typically has a resolution of 100,000×200,000 pixels, or 20 billion pixels. The image 35 is acquired by digital scanning of slide 34 in red, green and blue channels.

Figure 4:
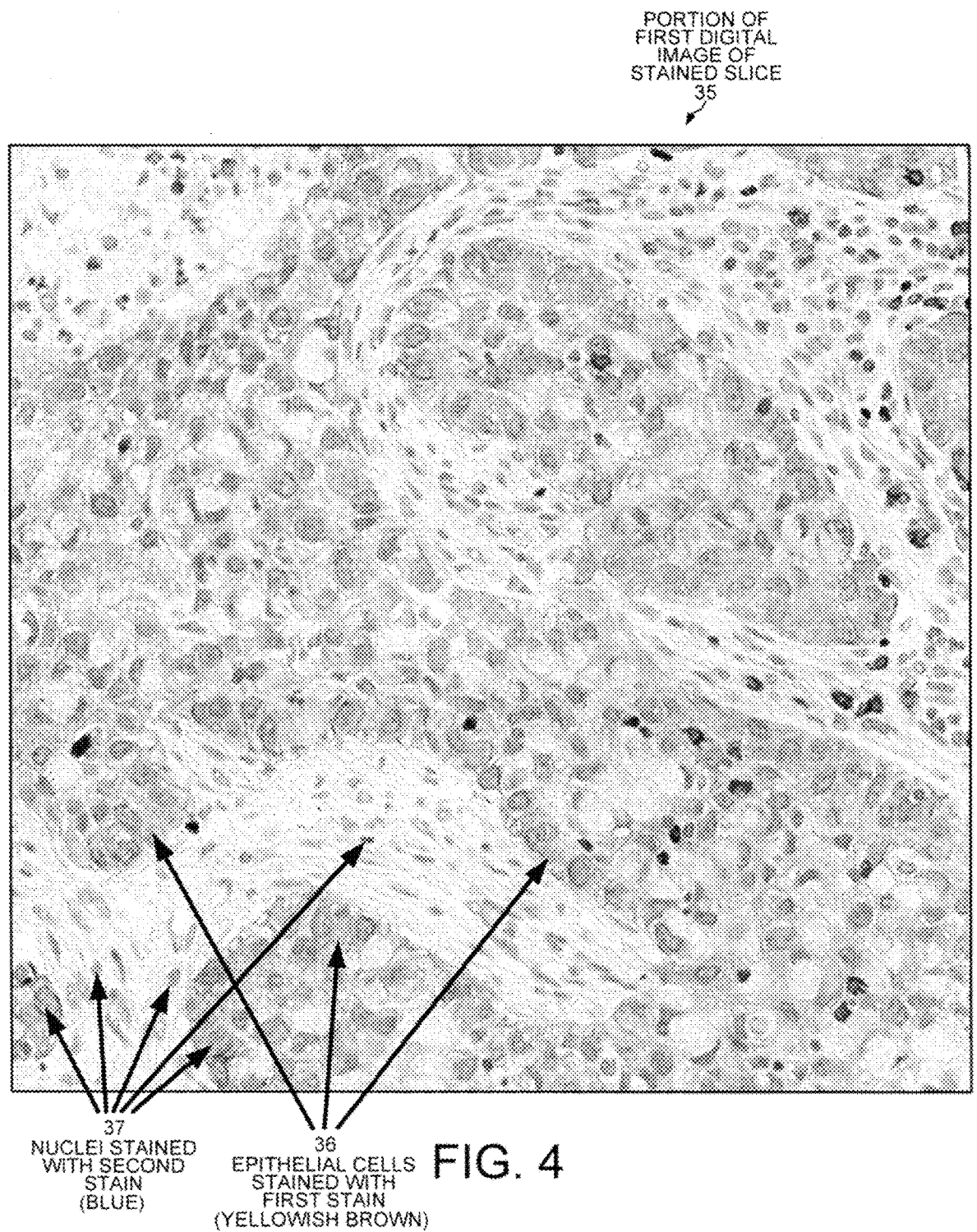
FIG. 4 is a first digital image of a tissue slice in which the epithelial cells have been stained by the first stain pan cytokeratin, and the nuclei have been stained by the second stain hematoxylin.

FIG. 4 shows a portion of the first digital image 35 acquired in step 20 displayed on the graphical user interface 15 of system 10. On tissue slice 33, the first stain PanCK has stained the epithelial cells 36 yellowish brown, and the second stain hematoxylin has stained the nuclei 37 blue.

In step 21, thresholding is used to distinguish the tissue from the background of the first digital image 35. The intensity of each pixel of image 35 is analyzed, a histogram is generated to determine a dividing intensity threshold, and the pixels are divided into tissue pixels and background pixels using the intensity threshold. Each pixel location is classified as belonging either to the class "tissue" or to the class "background" based on the intensity value of the pixel. In step 22, image analysis and a closing operation are used to define contiguous tissue regions on image 35. In an optional step 23, an expert human pathologist marks larger regions of interest within the tissue regions. This manual annotation is optional and used to mark a limited number, for example no more than a dozen, of regions of interest that likely contain cancerous tissue.

In step 24, image analysis is used to identify the region 38 stained by the first stain. System 10 recognizes the regions stained yellowish brown by panCK within the tissue regions. Where the optional step 23 is performed, the regions stained by panCK are detected in step 24 only within the regions of interest manually annotated in step 23. The regions stained by panCK are determined by identifying whether each pixel of the tissue region has a color that falls within the ranges of the red, green and blue color components that make up the yellowish brown imparted by panCK. In step 24, the detected region 38 comprises the regions of epithelial cells. Within a sample of glandular tissue 31 from cancer patient 32, the regions of epithelial cells stained by panCK identify likely cancerous regions within the digital image 35. In step 25, system 10 uses image analysis to identify the tissue region 39 that has not been stained by panCK. The non-panCK region contains nuclei stained blue by hematoxylin but does not contain any tissue stained yellowish brown by panCK.

Figure 5:
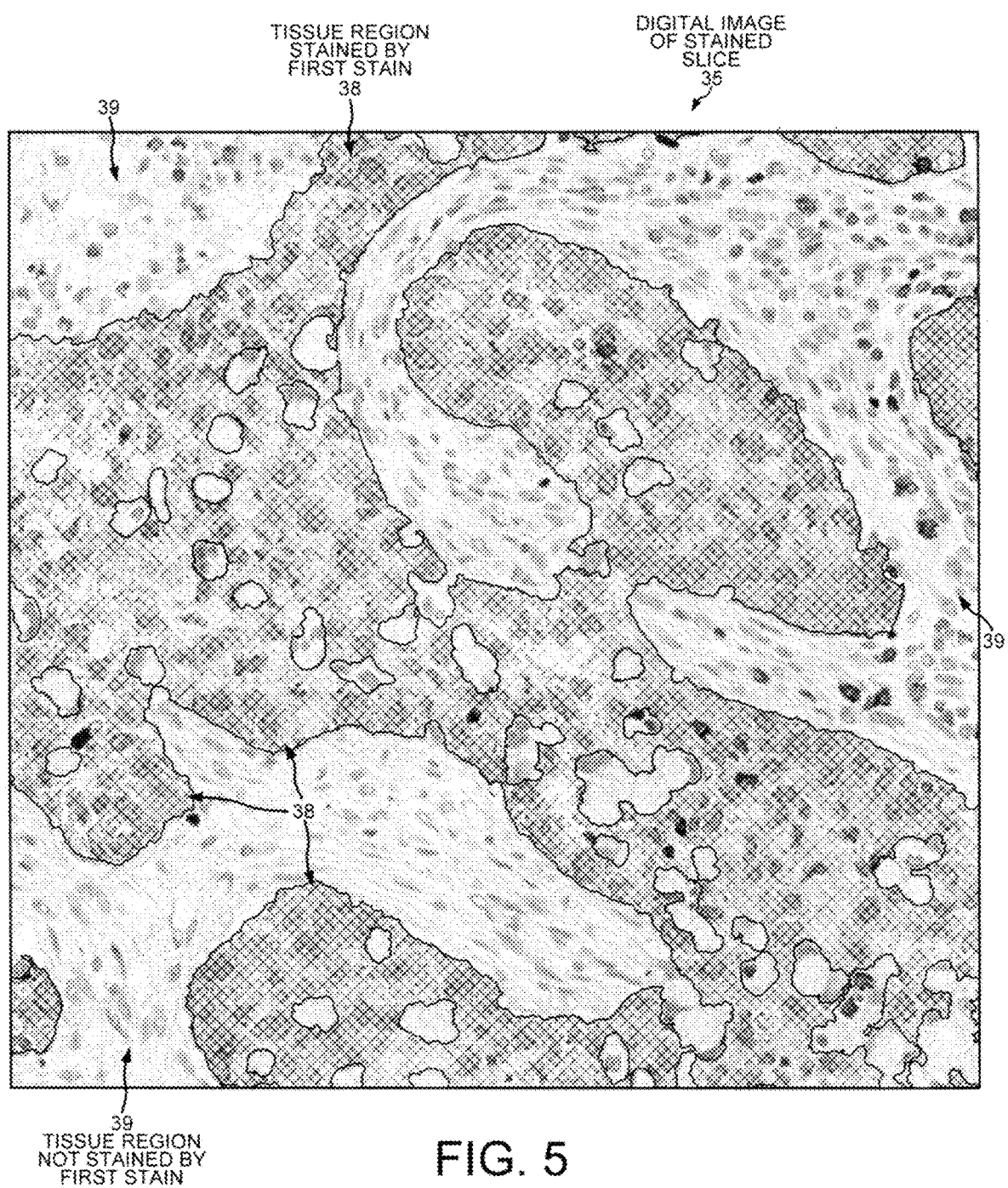
FIG. 5 shows the image of FIG. 4 with the region that is stained by the first stain pan cytokeratin marked with cross hatching; the region stained by the second stain hematoxylin but not by the first stain is not covered by cross hatching.

FIG. 5 shows the portion of digital image 35 of FIG. 4 with the region 38 marked with cross hatching that is stained by the first stain. The region 39 of tissue that has been stained with the second stain hematoxylin but not with the first stain panCK is the remaining area not covered by cross hatching.

In step 26, system 10 optimizes a plurality of parameters applied to associated mathematical operations to train a model based on the second stain hematoxylin but not on the first stain panCK to classify individual pixels of the digital image 35 as belonging to a likely cancerous region that is stained by the second stain.

Figure 6:
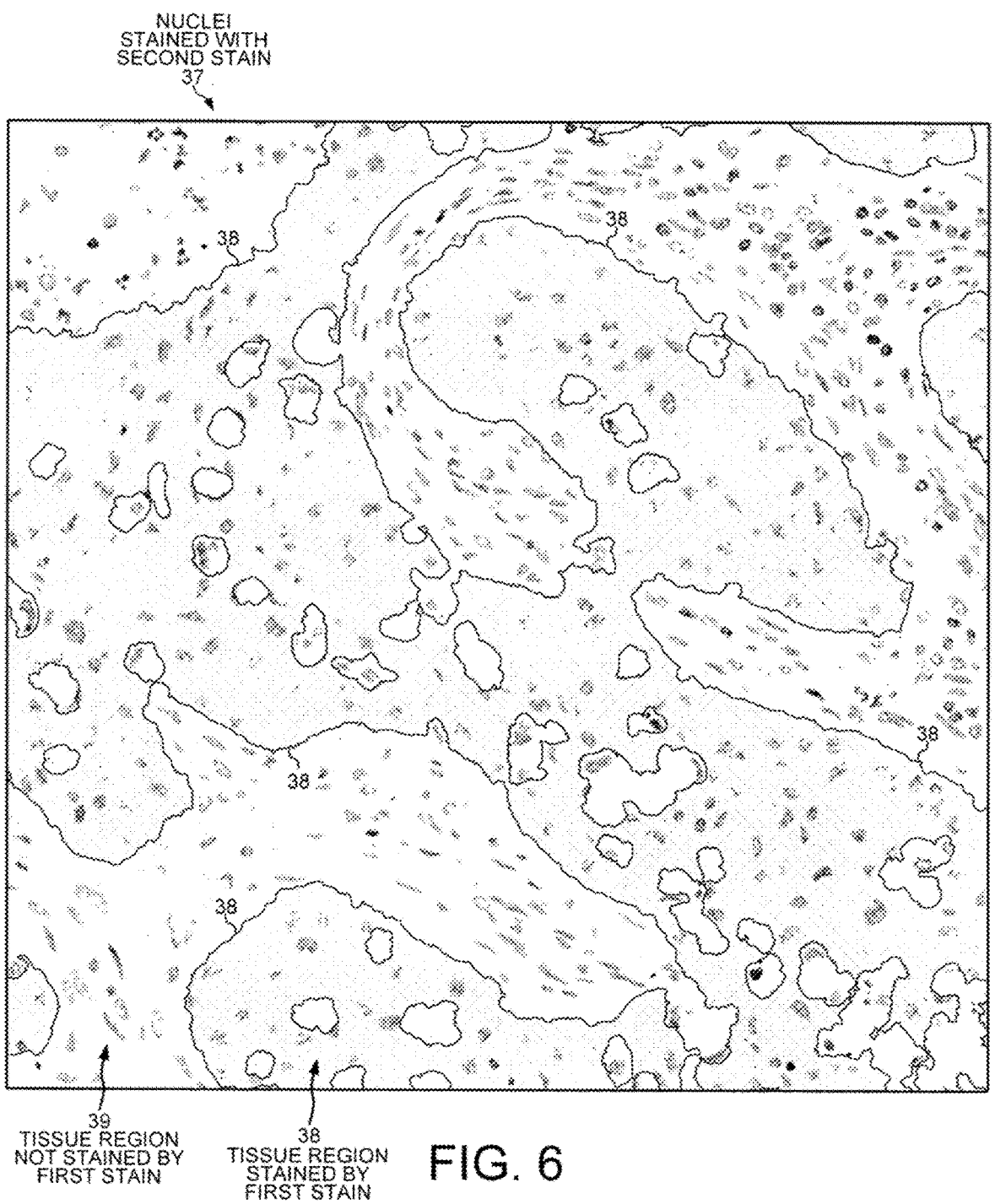
FIG. 6 illustrates the tissue shown in FIG. 4 with only the nuclei stained by the second stain but not any epithelial cells stained by the first stain.

FIG. 6 illustrates the portion of digital image 35 of FIG. 4 showing only the nuclei stained by the second stain hematoxylin but not any epithelial cells stained by the first stain panCK. An outline of the region 38 that was stained by the first stain in FIG. 5 is superimposed over the image of FIG. 6. In step 26, the convolutional neural network model is trained to distinguish characteristics of the nuclei within region 38 from nuclei that are outside region 38. No expert human pathologist can perceive the characteristics that distinguish the stained nuclei inside region 38 from the stained nuclei outside region 38. All of the nuclei stained by the second stain in FIG. 6 appear to a human observer to have approximately the same shapes, sizes, geometric features and topologies. However, deep learning using a convolutional neural network is able to identify the subtle differences between the nuclei inside and outside of region 38.

System 10 distinguishes the nuclei within region 38 from the nuclei outside region 38 by optimizing a plurality of parameters applied to associated mathematical operations that comprise the convolutional neural network model. The model is trained to optimize the parameters and operations based on the second stain hematoxylin but not on the first stain panCK so as to classify individual pixels of the digital image 35 as belonging to the likely cancerous region.

In step 27, the optimized plurality of parameters and associated mathematical operations of the trained model are stored in the database 14. The stored parameters and operations of the trained model are then applied to other digital images of tissue samples in step 28. For example, the trained model is run on a second digital image 40 of a tissue slice adjacent to tissue slice 33 that is stained with the second stain hematoxylin but not with the first stain panCK. For example, the adjacent tissue slice could be stained by a biomarker other than panCK because it might be undesirable to stain the adjacent slice with both panCK and the other biomarker. Applying the trained module to the second digital image 40 indicates the probability that each pixel of the second digital image 40 falls within the likely cancerous region that would have been stained by the first stain panCK.

The trained module is software that executes on the data processor 13 and performs intelligent image processing. Thus, data processor 13 includes a computer-readable storage medium having program instructions thereon for performing a method of using a second stain to predict the region that would be stained by a first stain. Such a computer-readable storage medium can include instructions for characterizing pixels in digital images based on the surrounding pixels. The model is a computer program product tangibly embodied on the computer-readable storage medium in data processor 13 and comprises computer readable and executable program instructions that when executed by the processor provide a visual display on the graphical user interface 15 of the interconnected display device 16, such as a personal computer.

Figure 7:
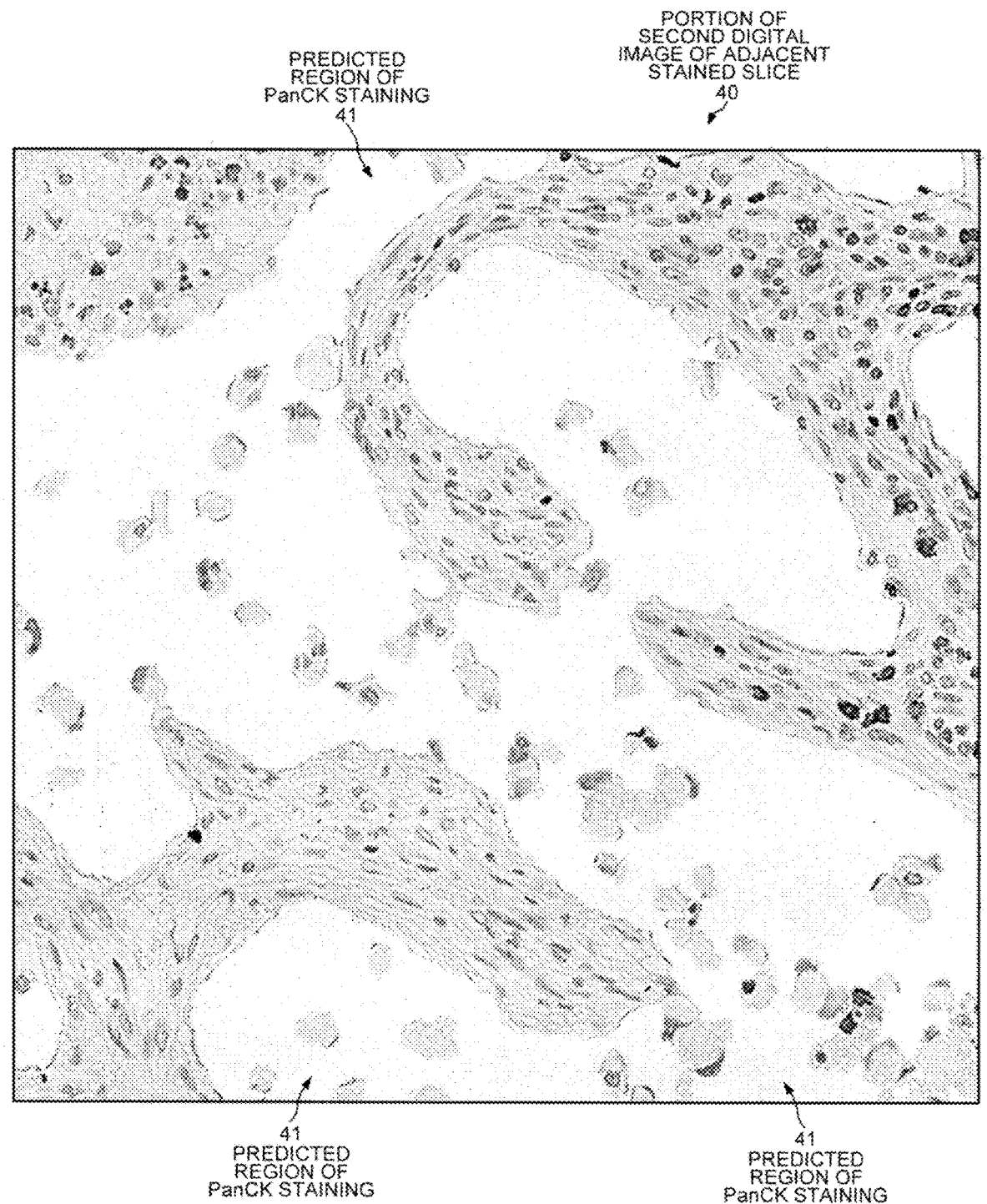
FIG. 7 is a second digital image of a slice of tissue adjacent to the slice shown in FIG. 4 in which each pixel that probably falls within the region predicted to be stained by the first stain is assigned the color white.

FIG. 7 shows a portion of the second digital image 40 that corresponds to the coregistered portion of digital image 35 of FIG. 4. First digital image 35 and second digital image 40 are images of adjacent slices of tissue of the sample 31 taken from cancer patient 32. The trained model has been run on the second digital image 40 and has used only the second stain hematoxylin to predict those regions that would have been stained by the first stain panCK even though the slice adjacent to slice 33 was never stained with panCK. In FIG. 7, system 10 has assigned a white color to each pixel of the second digital image 40 that has a greater than 50% probability of falling within the region 41 predicted to have been stained by panCK.

In step 29, system 10 generates a prediction image 42 in which each pixel location of the second digital image 40 has an intensity, color or marking indicative of the probability that the associated pixel of the second digital image 40 would fall within the likely cancerous region that would have been stained by the first stain panCK.

Figure 8:
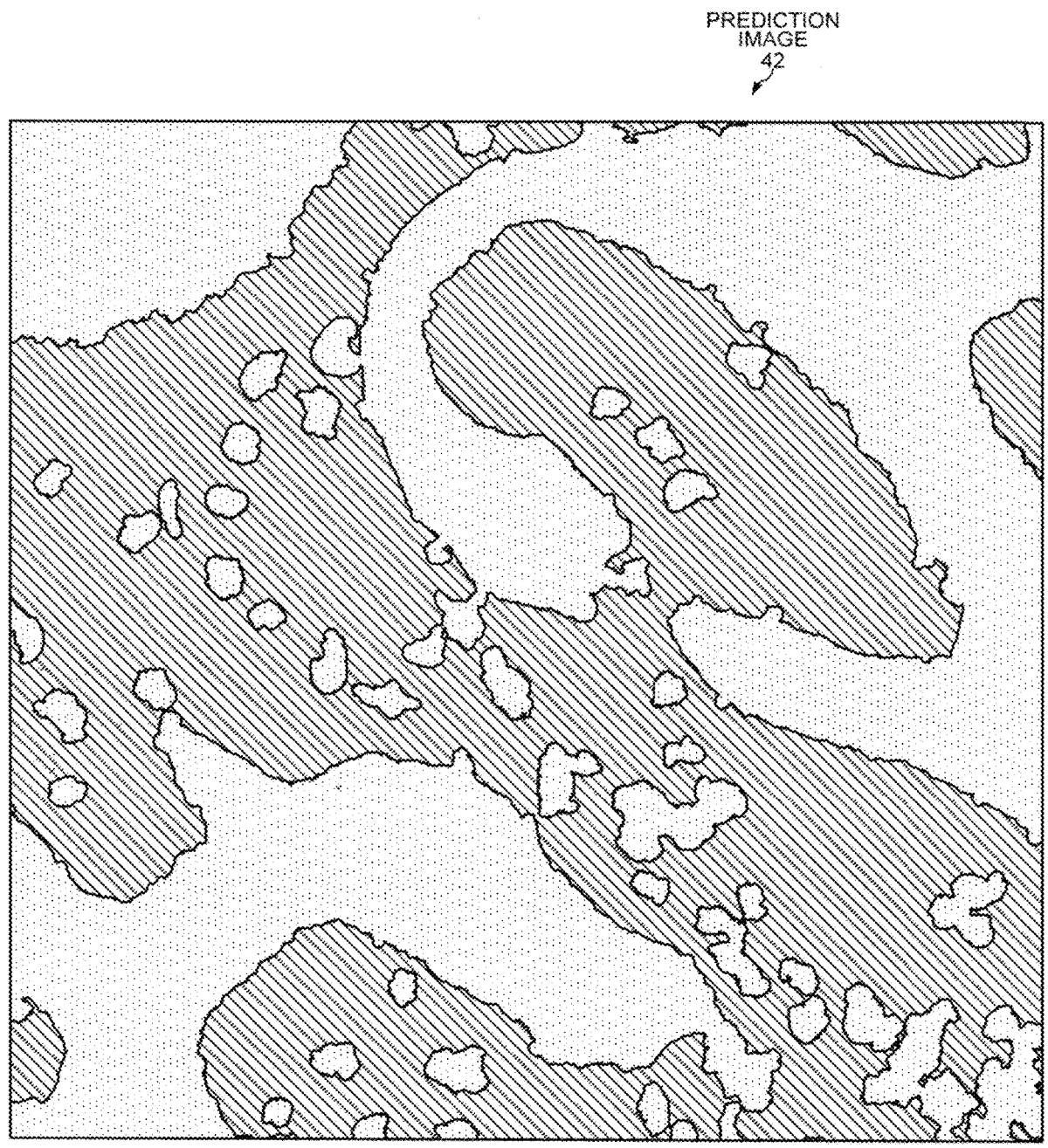
FIG. 8 shows a portion of a prediction image in which pixel locations corresponding to the second digital image of FIG. 7 are marked with diagonal hatching to indicate a high predicted probability of falling within the likely cancerous region that would have been stained by the first stain.

FIG. 8 shows a portion of a prediction image 42 that corresponds to the portion of second digital image 40 that is coregistered with the image portion of FIG. 4. The pixel locations of prediction image 42 are marked with diagonal hatching for corresponding pixel locations of the coregistered second digital image 40 that have a high predicted probability of falling within the likely cancerous region that would have been stained by the first stain panCK. All or just a portion of the prediction image 42 is displayed on the graphical user interface 15 of the user work station 16.

Figure 9:
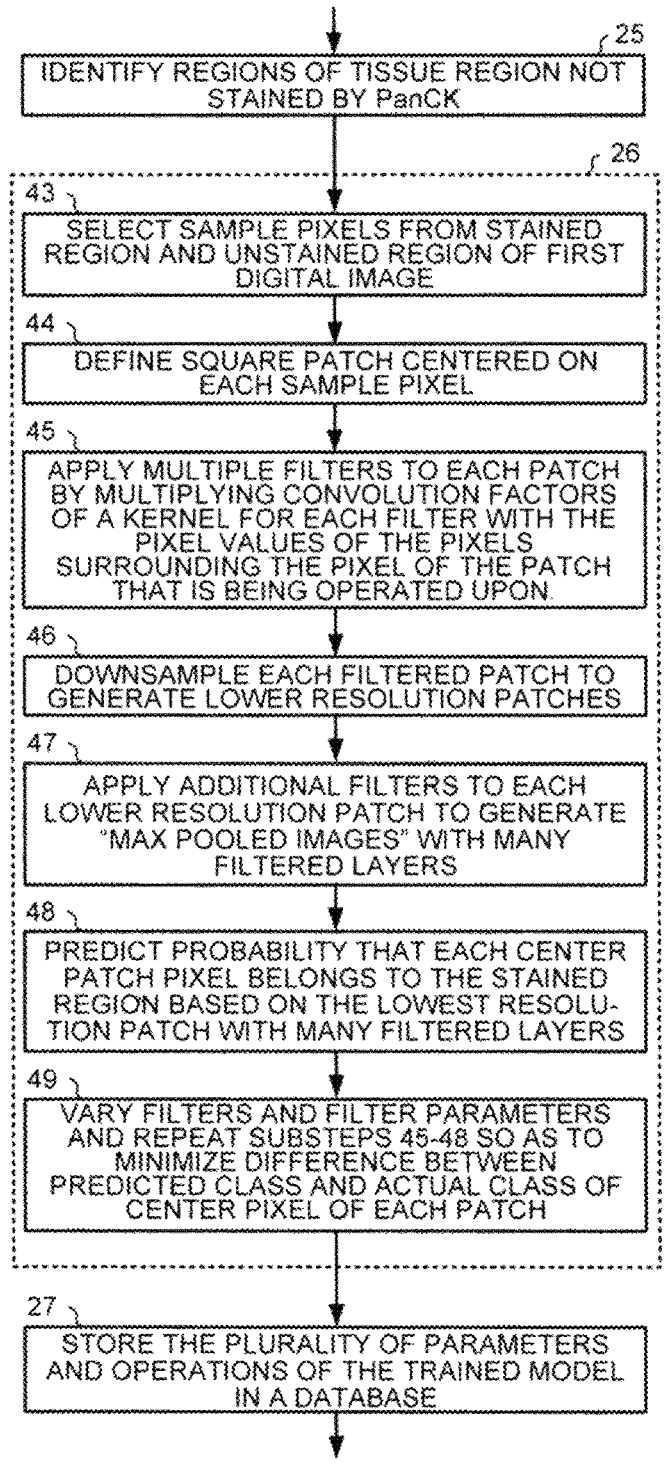
FIG. 9 is a flowchart of substeps of the step in FIG. 2 for optimizing the parameters of the model based on the second stain but not on the first stain to classify pixels of the first image as belonging to a region that would have been stained by the first stain.

FIG. 9 is a flowchart of substeps 43-49 of the step 26 in FIG. 2 for optimizing the parameters of the model based on the second stain but not on the first stain to classify pixels of the first digital image 35 as belonging to the region 41 predicted to have been stained by the first stain.

In substep 43, a predetermined number of sample pixels are selected from the detected region 38 that was stained by the first stain, as shown in FIG. 6. The region 38 detected by image analysis in step 24 to have been stained by the first stain can extend over the entire first digital image 35 and not merely over the portion of image 35 shown in FIG. 6. The sample pixels are selected at random pixels positions throughout region 38. In one embodiment, the predetermined number of sample pixels is 10,000; in another embodiment the predetermined number is 83,268. The sample pixels are selected in order to reduce the computing resources required to predict the stained region. The resolution of the prediction of stained pixels is lower for a smaller number of sample pixels selected. Thus, in yet another embodiment where computing resources need not be conserved, the predetermined number of sample pixels is all of the pixels in the stained region 38 of the first digital image 35. Still in substep 43, a second set of the predetermined number of sample pixels are also selected from random pixel positions throughout region 39 of the first digital image 35 that was not stained by the first stain.

In substep 44, a patch is defined around each of the sample pixels in the stained region 38 and in the unstained region 39. Thus, each patch is classified as belonging to the stained region or to the unstained region. In one embodiment, each patch is a square of 142×142 pixels that is approximately centered (off center by ½ pixel) at the position of each sample pixel.

Figure 10:
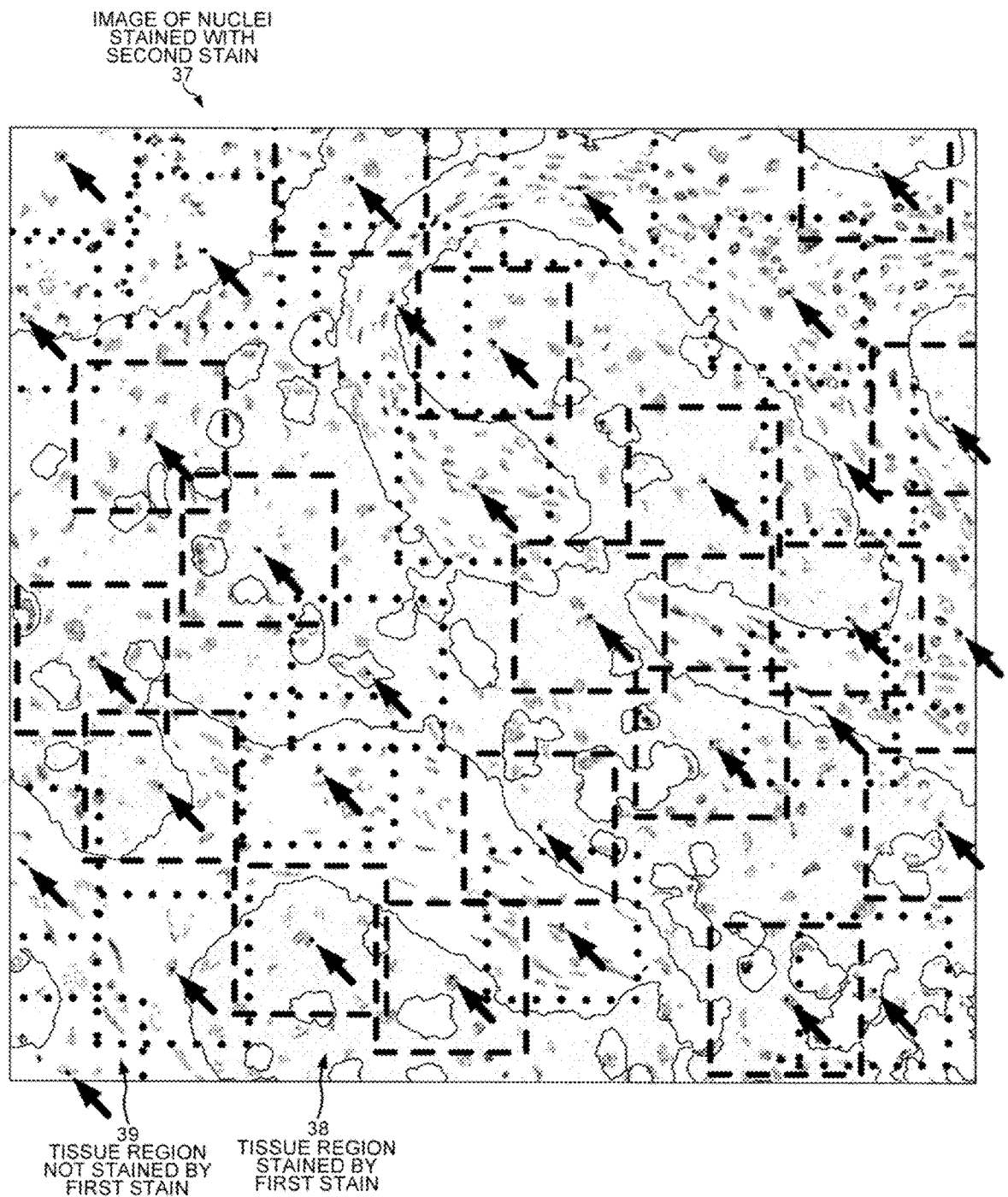
FIG. 10 is the image portion of FIG. 6 showing only nucleus staining by the second stain with superimposed outlines of various patches centered on sample pixels.

FIG. 10 illustrates the outlines of various patches centered on sample pixels on the image portion of FIG. 6 that shows only nuclei stained blue by the second stain and does not show any staining by the first stain. Where the random pixel positions of the sample pixels are closer together, the patches can overlap. The patches centered on sample pixels in the stained region 38 are outlined with dashed lines, whereas the patches centered on sample pixels in the unstained region 39 are outlined with dotted lines. Arrows point to the sample pixels at the centers of the patches.

In substep 45, each patch is filtered by applying a mathematical operation to each pixel of each patch. The mathematical operation is applied by multiplying the convolution factors of a kernel with the pixel values of the pixels surrounding the pixel of the patch that is being operated upon. The result of the mathematical operation for each pixel is the sum of the products obtained by multiplying by the convolution factors of the kernel. In one embodiment, the kernel is a 3×3 matrix of convolution factors that is multiplied by the pixel values of a 3×3 matrix of pixels centered on the pixel being operated upon.

The result of the filtering is a filtered patch for each mathematical operation or filter applied to the patch. Multiple filters are applied to each patch resulting in multiple filtered images. Each mathematical operation or filter has an associated kernel with convolution factors. Each filter is used to recognize a basic geometric feature, such as a vertical line, a horizontal line or a curve. In one embodiment, sixteen filters are applied to each patch, which results in a 142×142-pixel patch with sixteen filtered layers.

In substep 46, the resolution of the filtered patches with multiple filtered layers is reduced to generate maximum pooled images. The filtered 142×142-pixel patches are downsampled by selecting the maximum intensity pixel from each 2×2 box of the filtered patch, which generates a lower resolution patch of 71×71 pixels, called a "max pooled image." The lower resolution patch still has sixteen filtered layers.

In substep 47, each of the lower resolution patches is filtered by applying more mathematical operations to each pixel of the lower resolution patches. In one embodiment, sixteen additional filters are applied to each of the lower resolution patches, which results in 71×71-pixel patches each with sixteen times sixteen filtered layers. The filtering and downsampling steps are repeated until 7×7-pixel "max pooled images" with 256 filtered layers are obtained.

In substep 48, the predicted probability of a center patch pixel belonging to the stained region is determined based on the lowest resolution patch with many filtered layers. A weighted sum of each 7×7-pixel patch is calculated, which results in a probability that classifies the central pixel of the patch as belonging either to the stained region 38 or to the unstained region 39. The predicted classification of the central pixel is then compared to the actual class of the patch as illustrated in FIG. 10.

In substep 49, the mathematical operations of the filters as well as the parameters of those filters are optimized to more accurately predict the class of the central pixel of each patch. Substeps 45-48 are repeated using slightly varied mathematical operations of the filters and parameters of those filters. The filters and filter parameters are changed so as to minimize the difference between the predicted probability that a center pixel belongs to the stained class or the unstained class and the actual class of the center pixel of each patch. The optimized filters and filter parameters that most accurately classify the center pixels of all of the patches comprise the trained convolutional neural network model that predicts which regions of a tissue slice would have been stained by the first stain based only on how the tissue was stained by the second stain. The optimized mathematical operations (filters) and filter parameters are then stored in database 14 in step 27. Then the optimized filters and filter parameters that were trained on the sample pixels of the first digital image 35 are applied to all of the pixels of the second digital image 40 to determine the predicted region 41 of staining by the first stain.

Example of Optimizing Filter Operations and Parameters.

An example is now provided of how substeps 43-49 of step 26 in the flowchart of FIG. 9 are performed. Substeps 43-49 are performed to optimize the parameters of the convolutional neural network model based on the second stain and without any first stain in order to classify pixels of the first digital image 35 as belonging to the region 41, which is predicted to have been stained by the first stain. In this example, the image was captured as pixel values corresponding to red-green-blue values and subsequently converted to pixel values corresponding to gray scale values ranging from 0 (dark) to 252 (light).

In substep 43, a predetermined number of sample pixels are selected from the detected region 38 that was stained by the first stain, as shown in FIG. 6. In this example, the predetermined number is 83,268 pixels selected from an image having a total of 50,000×50,000 pixels. The predetermined number is arbitrary. Still in substep 43, a second set of 83,268 sample pixels is selected from random pixel positions throughout region 39 of the first digital image 35 that was not stained by the first stain.

Figure 11:
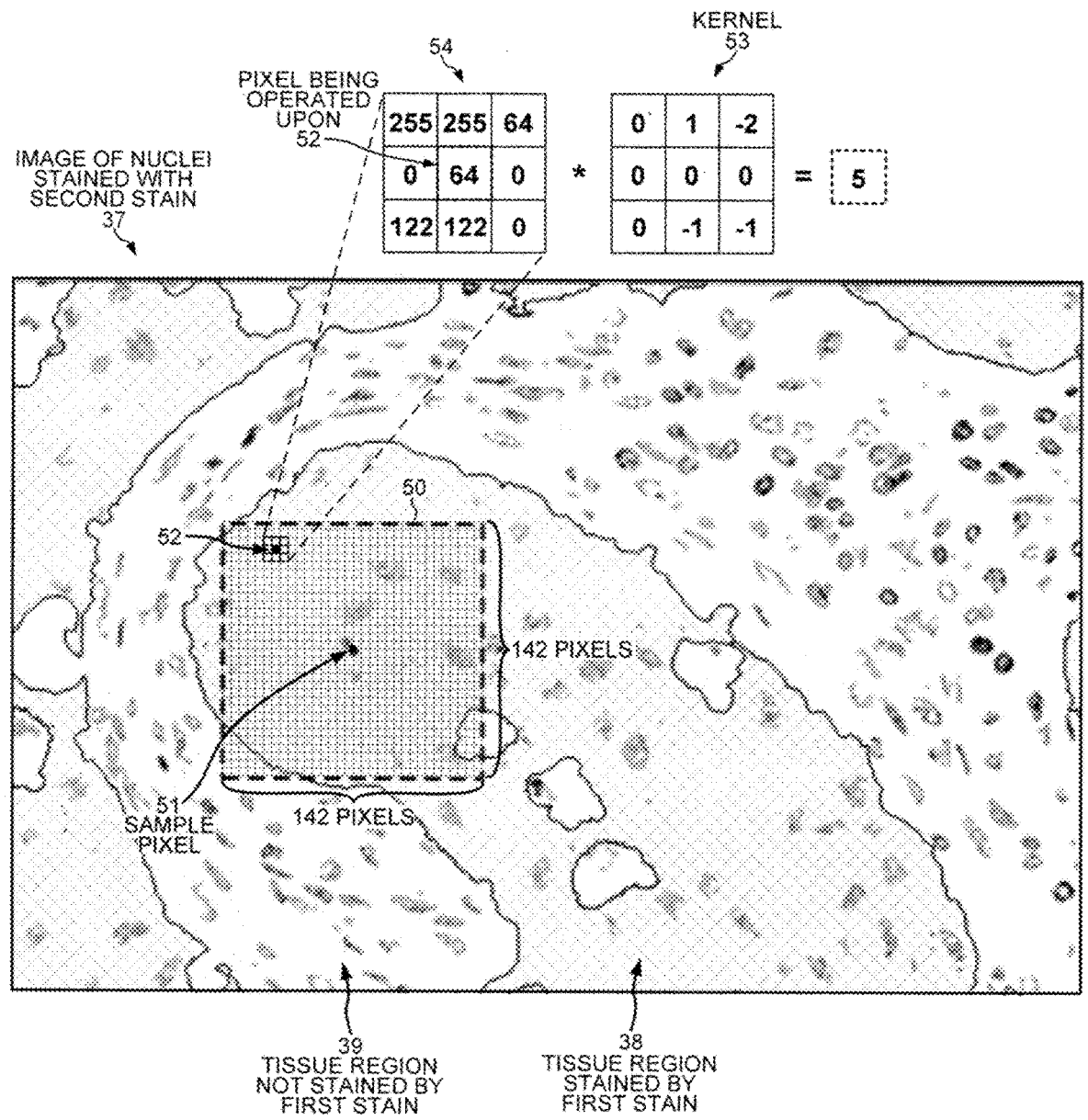
FIG. 11 shows a smaller portion of the image of FIG. 6 and illustrates an exemplary patch used to optimize the parameters of the model.

In substep 44, a patch is defined around each of the sample pixels in the stained region 38 and in the unstained region 39. In this example, each patch is a square of 142×142 pixels that is approximately centered (off center by ½ pixel) at the position of each sample pixel of the 83,268 sample pixels. FIG. 11 illustrates a patch 50 centered on a sample pixel 51 in the stained region 38.

In substep 45, each patch is filtered by applying a mathematical operation to each pixel of each patch. The mathematical operation is applied by multiplying the convolution factors of a convolution kernel with the pixel values of the pixels surrounding the pixel 52 of the patch that is being operated upon. For example, the filter can be a Laplacian operator, a Gaussian operator or a Sobel operator. In this example, the convolution kernel is a 3×3 matrix containing the nine convolution factors denoted as x11, x12, x13; x21, x22, x23; x31, x32, x33.

FIG. 11 illustrates a filter or convolution operation being performed on the exemplary pixel 52 of the patch 50. Pixel 52 has the pixel value "64". The convolution kernel 53 is applied to a square of 3×3 pixels 54 centered on pixel 52 and having pixel values denoted as w11, w12, w13; w21, w22, w23; w31, w32, w33. In the example operation illustrated in FIG. 11, the pixel values are 255, 255, 64; 0, 64, 0; 122, 122, 0, and the convolution factors are 0, 1, −2; 0, 0, 0; 0, −1, −1. Each pixel value represents a gray-scale value of the pixel. The convolution operation is determined by calculating the sum of the products of the convolution factors of kernel 53 times the pixel values of the corresponding matrix position of pixel square 54: x11*w11+x12*w12+x13*w13+x21*w21+x22*w22+x23*w23+x31*w31+x32*w32+x33*w33. In this example, the convolution operation is calculated as follows: 0*255+1*255+(−2)*64+0*0+0*64+0*0+0*122+122*(−1)+0*(−1)=5. Following the convolution operation on pixel 52, the pixel value of "64" is replaced with the pixel value "5". In this example, the step by which the convolution kernel 53 is moved from one pixel of patch 50 to the next pixel that is being operated upon is 1. Thus, the sum-of-the-products convolution operation using the convolution factors of kernel 53 is performed on each pixel of patch 50 to generate a filtered patch of 142×142 pixels.

The convolution operation shown in FIG. 11 is just one of several filters that are applied to each patch. Because multiple filters are applied to each patch, multiple filtered images are generated. Each mathematical operation or filter has an associated kernel with associated convolution factors. The first convolution is executed in two dimensions, and any subsequent convolutions are carried out in three dimensions. In this example, sixteen filters are applied to each patch, which results in a 142×142-pixel patch with sixteen filtered layers. Still in substep 45, a rectified linear unit (ReLU) is applied to the pixels of each patch. The rectified linear unit is a function that returns zero for any pixel with a negative pixel value; for any pixel with a positive pixel value, that value is returned.

In substep 46, the resolution of the filtered patches with multiple filtered layers (such as sixteen) is reduced by generating maximum pooled images. The filtered 142×142-pixel patches are downsampled by selecting the maximum intensity pixel from each 2×2 square of pixels of the filtered patch of 142×142 pixels, which generates a lower resolution patch called a "max pooled image." The lower resolution patch still has sixteen filtered layers. In this example, because the convolution is carried out without a padding step, two pixels are lost in the convolution, so the convolution of the patch of 142×142 pixels results in a patch 140×140 pixels. After downsampling, each patch of 142×142 pixels is downsampled to a patch of 70×70 pixels ((142−2)/2 pixels).

In substep 47, each of the lower resolution patches is filtered by applying more mathematical operations to each pixel of the lower resolution patches. In this example, sixteen additional filters are applied to each of the lower resolution patches, which results in 70×70-pixel patches each with thirty-two (16*2) filtered layers. In the next step, filtering and downsampling results in 34×34-pixel patches ((70-2)/2), each containing sixty-four (16*2*2) layers. In the next step, filtering and downsampling results in 16×16-pixel patches ((34−2)/2), each containing one hundred twenty-eight layers (16*2*2*2). In the next step, filtering and downsampling results in 7×7-pixel patches ((16−2)/2), each containing two hundred fifty-six layers (16*2*2*2*2). Thus, the filtering and downsampling steps are repeated until 7×7-pixel "max pooled images", each with 256 filtered layers, are obtained.

In substep 48, the predicted probability of a center patch pixel belonging to the stained region is determined based on the lowest resolution patch with many filtered layers. In this substep, filtering with a 7×7 convolution kernel results in 1×1 pixel patches each containing 512 layers (16*2*2*2*2*2). Each 7×7 pixel patch containing 256 layers results in single pixel values after convolution with the 7×7 convolution kernel. After downsampling the 512 single pixel values, 256 1×1-pixel patches are obtained that are reduced to two 1×1 pixel patches in an additional convolution step. Thus, two pixel values are obtained.

Finally, a SoftMax function is applied to the two pixel values to perform a prediction and classification operation that indicates the specific category to which these two pixel values belong. For example, a multinomial logistic loss function can be applied. A weighted sum of each 7×7-pixel patch is calculated, which results in a probability that classifies the central pixel of the patch as belonging either to the stained region 38 or to the unstained region 39. In this example, the pixel values are 5 and 15, and the predicted probability scores of the two pixels belonging to the stained region are 0.3 and 0.7. This is a weighted sum because 0.3+0.7=1. The predicted classification of the central pixel 51 of the patch 50 is transformed into a vector. In this example, the values 0.3 and 0.7 result in the vector (0,1). Then the vector is compared to the actual classification of the patch that has been determined by a human pathologist. In this example, the classification corresponding to the vector (0,1) and is PanCK-positive. The values determined by the pathologist are 1 and 0, which can be expressed as the vector (1,0) corresponding to a classification as PanCK-negative. In this example, the comparison between the predicted scores and the actual scores is carried out by calculating the square error. The error for each value is 0.7 (1−0.3=0.7 and 0−0.7=−0.7), which leads to square errors of (0.72 and 0.72)=1/2√/(0.49+0.49).

In substep 49, the mathematical operations of the filters as well as the parameters (convolution factors) of those filters are optimized to more accurately predict the class of the central pixel of each patch. Substeps 45-48 are repeated using slightly varied mathematical operations of the filters and parameters of those filters. Back propagation or another method of supervised learning is used to vary and improve the mathematical operations of the filters and parameters of those filters. The optimized filters and filter parameters that most accurately classify the center pixels of all of the patches comprise the trained convolutional neural network model that predicts which regions of a tissue slice would have been stained by the first stain based only on how the tissue was stained by the second stain.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
acquiring a first digital image of first cancerous tissue that has been stained with a first stain and with a second stain;
identifying a likely cancerous region in the first digital image based on the first stain;
optimizing parameters of mathematical operations of a model to train the model based on the second stain but not on the first stain to classify individual pixels of the first digital image as belonging to the likely cancerous region; and
storing the parameters and mathematical operations of the model for applying to a second digital image to indicate a probability that each pixel of the second digital image falls within the likely cancerous region, wherein the second digital image is acquired from second cancerous tissue that is stained with the second stain but not with the first stain.

2. The method of claim 1, further comprising:
generating a prediction image in which each pixel location of the second digital image is marked to indicate the probability that the associated pixel of the second digital image falls within the likely cancerous region.

3. The method of claim 1, wherein the model is a convolutional neural network model, and wherein the optimizing the parameters involves training the convolutional neural network model.

4. The method of claim 1, wherein the first stain stains epithelial cells, and the second stain stains nuclei.

5. The method of claim 1, wherein the likely cancerous region is predominantly epithelial cells that have been stained by a cytokeratin stain.

6. The method of claim 1, wherein the first stain is taken from the group consisting of: pan cytokeratin, cytokeratin 18, α-methylacyl coenzyme A racemase (AMACR), cluster of differentiation 3 (CD3) antibody stain, cluster of differentiation 4 (CD4) antibody stain and cluster of differentiation 68 (CD68) antibody stain.

7. The method of claim 1, wherein the second stain is taken from the group consisting of: fluorescent 4, 6-diamidino-2-phenylindole (DAPI) and hematoxylin.

8. The method of claim 1, wherein the first stain is selected from the group consisting of: an immunohistochemical stain, and an immunofluorescence stain.

9. The method of claim 1, wherein the second stain is a counterstain.

10. The method of claim 1, wherein one of the mathematical operations is selected from the group consisting of: convolution filtering that applies a kernel to pixels surrounding a central pixel, and a Gaussian filter applied to pixel values through a convolution matrix.

11. A method comprising:
identifying a target region in a digital image using image analysis based on a first stain, wherein the digital image depicts tissue from a cancer patient that has been stained with a first stain and with a second stain;
optimizing parameters of mathematical operations of a model to train the model to classify individual pixels of the digital image as belonging to the target region based on the second stain but not on the first stain; and
generating a prediction image for which each pixel location is marked to indicate the probability that the associated pixel of the digital image belongs to the target region.

12. The method of claim 11, wherein one of the mathematical operations is convolution filtering that applies a kernel to neighboring pixels.

13. The method of claim 11, wherein one of the mathematical operations is a Gaussian filter applied to pixel values through a convolution matrix.

14. The method of claim 11, wherein each pixel location is marked to indicate the probability of belonging to the target region by an intensity of the pixel location.

15. The method of claim 11, wherein the first stain stains epithelial cells, and the second stain stains nuclei.

16. The method of claim 11, wherein the first stain is an immunohistochemical stain.

17. The method of claim 11, wherein the second stain is a counterstain.

18. The method of claim 11, wherein the first stain is taken from the group consisting of: pan cytokeratin, cytokeratin 18, α-methylacyl coenzyme A racemase (AMACR), cluster of differentiation 3 (CD3) antibody stain, cluster of differentiation 4 (CD4) antibody stain and cluster of differentiation 68 (CD68) antibody stain.

19. The method of claim 11, wherein the second stain is taken from the group consisting of: hematoxylin and fluorescent 4, 6-diamidino-2-phenylindole (DAPI).

20. A method with a training mode and a prediction mode, comprising:

in the training mode, acquiring a first digital image of first tissue, wherein the first tissue is stained with a first stain that has a first color, and wherein the first tissue is stained with a second stain that has a second color;

determining using image analysis based on the first color whether each pixel of the first digital image falls within a region of interest;

generating parameters of a model that indicate a probability that each pixel of the first digital image falls within the region of interest using the second color but not the first color; and in the prediction mode, using the parameters of the model to indicate the probability that each pixel of a second digital image falls within the region of interest using the second color, wherein the second digital image is acquired from a second slice of tissue that is stained with the second stain but not with the first stain.

21. The method of claim 20, wherein the model is a convolutional neural network model, and wherein the generating the parameters involves training the convolutional neural network model.

22. The method of claim 20, further comprising:

generating a prediction image in which each pixel location of the second digital image is marked to indicate the probability that the associated pixel of the second digital image falls within the region of interest.

* * * * *